July 23, 1957  S. BECKWITH  2,800,249
TANKS FOR STORING COLD BOILING LIQUIDS
Filed Dec. 6, 1954  3 Sheets-Sheet 1

Inventor
Sterling Beckwith
by Parker & Carter
Attorneys

July 23, 1957 S. BECKWITH 2,800,249
TANKS FOR STORING COLD BOILING LIQUIDS
Filed Dec. 6, 1954 3 Sheets-Sheet 2

Inventor
Sterling Beckwith by Parker & Carter
Attorneys

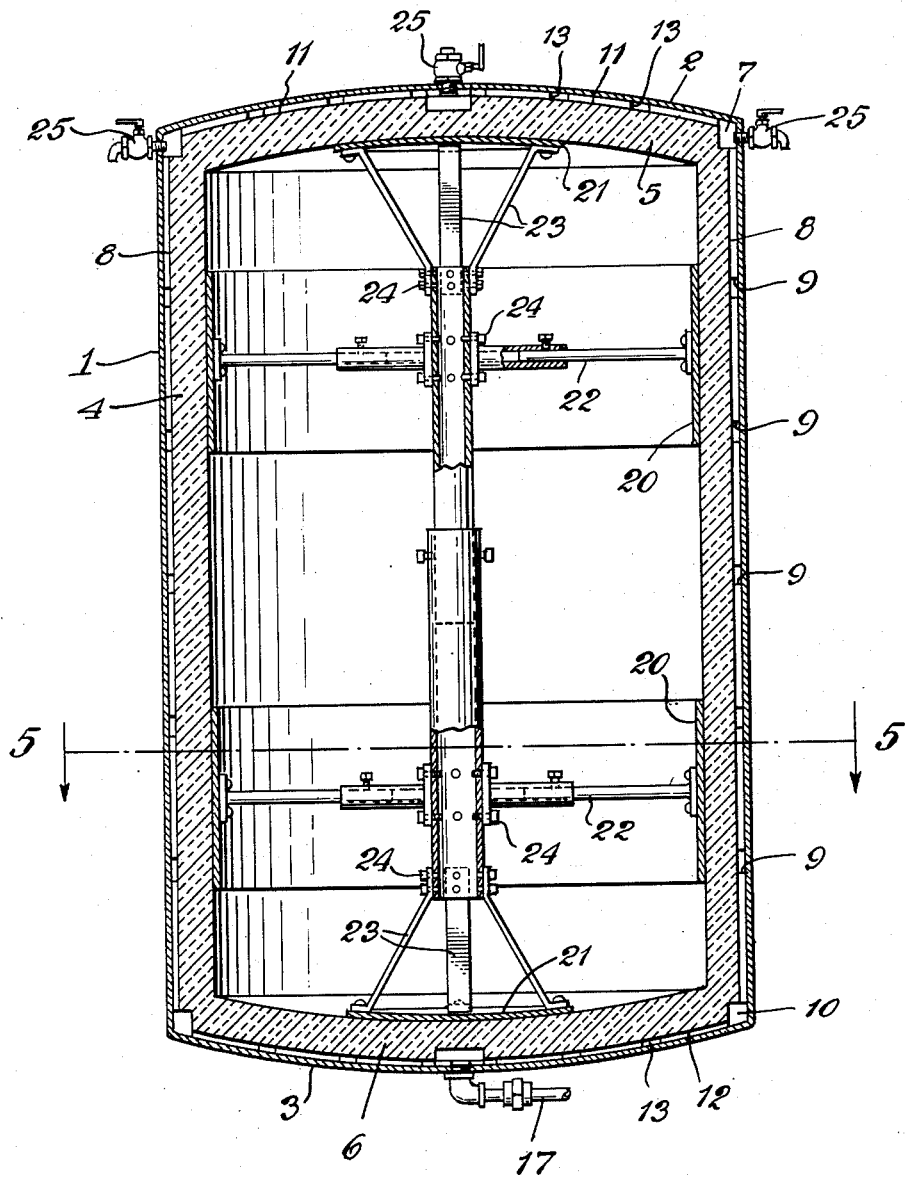

United States Patent Office 2,800,249
Patented July 23, 1957

2,800,249

TANKS FOR STORING COLD BOILING LIQUIDS

Sterling Beckwith, Lake Forest, Ill., assignor, by mesne assignments, to Constock Liquid Methane Corporation, a corporation of Delaware Application December 6, 1954, Serial No. 473,187

4 Claims. (Cl. 220—65)

My invention relates to improvements in tanks for storage of cold boiling liquids and to a method of manufacturing such tank.

Cold boiling liquids, such for example as methane or natural gas, which at atmospheric pressure, boil at approximately $-258°$ F., are so cold that not only must the liquid be insulated from the ambient temperature, but also the metal, such as steel, used for the wall of the tank, must be protected from contact with the liquid. This requires that the insulation be inside the tank wall. When the insulating lining is installed, under usual conditions to completely mask the metal wall of the tank, the cold liquid may so cool and shrink the lining as to cause rupture or crack formation which might permit free access of the liquid through the lining to the metal wall. This can be prevented by providing a pre-compressed lining, the degree or extent of the pre-compressed lining being such that the shrinkage resulting from the cold will be less than the shrinkage resulting from the pre-compression. Thus the lining will remain tight even in contact with the cold liquid.

I propose to accomplish this pre-compression as follows: I will assemble in the steel tank, which will preferably though not necessarily be cylindrical, by any convenient means, a continuous porous insulating lining. The lining may well be to some extent pervious to the liquid, and may for example, be built up of such material as balsa wood, cork board or other insulating material and will at first be under little if any compression, and will completely mask the steel tank wall. After the lining has been installed, it will be precompressed by forcing into the clearance between the steel and the lining or into the lining itself a hydraulic fluid which will compress and so shrink the lining.

The hydraulic fluid will preferably be of a material which after the installation is complete will take a permanent set so as to obviate the necessity of maintaining a continuous pressure on the fluid. Paraffin, a mixture of paraffin and resin or other liquids which will set with temperature change or which will set after exposure to air may any of them be used to build up the pressure on the insulating lining sufficient to compress it beyond the point to which it will shrink when chilled by the cold liquid.

My invention is illustrated more or less diagrammatically in the accompanying drawings, wherein—

Figure 4 is a vertical section through the tank illustrating the means for supporting the lining during compression;

Like parts are indicated by like characters throughout the specification and drawings.

Figure 1:
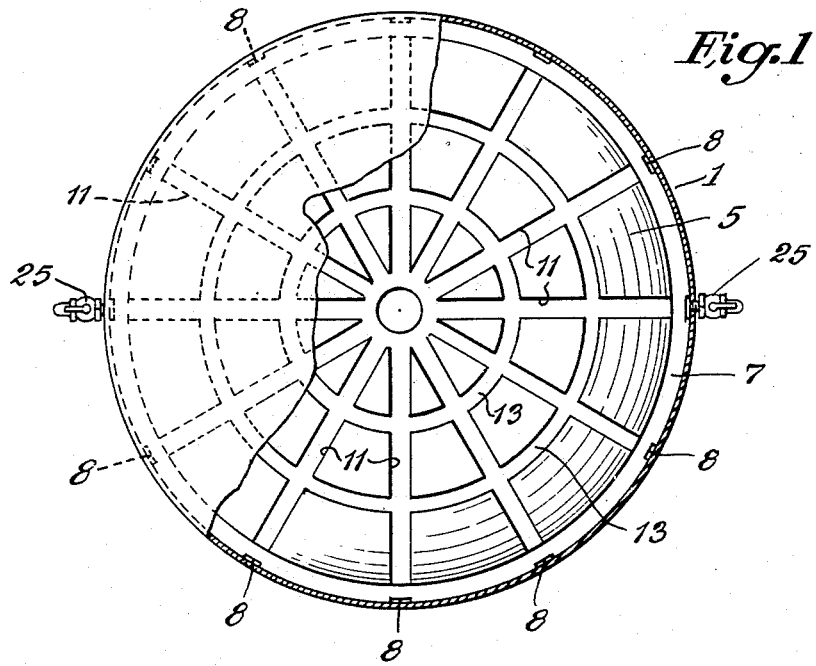
Figure 1 is a plan view of a tank according to my invention.
Figure 5:
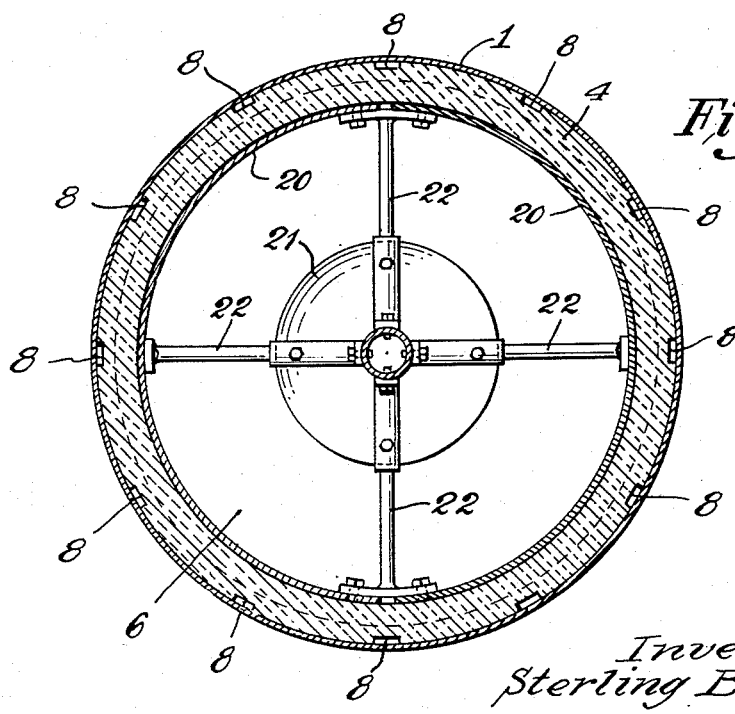
Figure 5 is a section along the line 5—5 of Figure 4.
Figure 2:
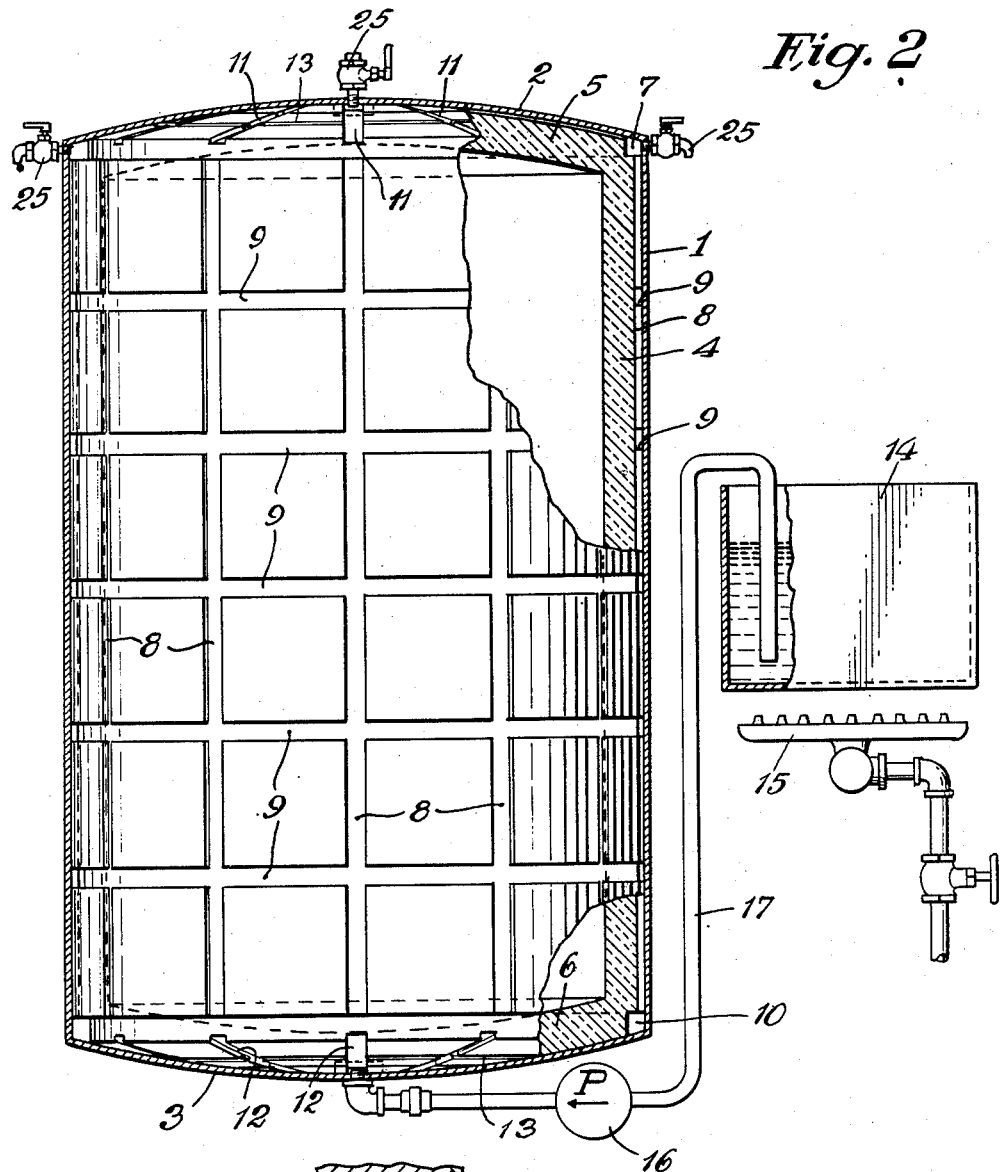
Figure 2 is a side view of the device of Figure 1 with parts cut away to show the lining in elevation.
Figure 3:
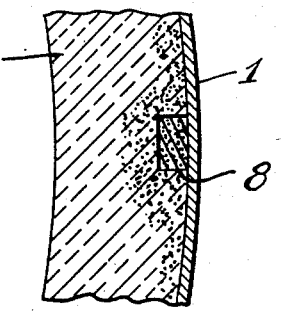
Figure 3 is a horizontal section through a portion of the tank wall on an enlarged scale.

1 indicates the cylindrical wall of a steel tank having steel top and bottom walls 2 and 3. 4 is a porous compressible insulating lining masking the cylindrical wall and 5 and 6 are top and bottom insulating linings masking the steel top and bottom walls. The lining thus defines as assembled, a complete mask for the top, bottom and side walls of the tank.

There will be some measure of clearance between the lining and the steel wall which clearance may well be irregular and discontinuous. 7 is a manifold passage extending about the upper outer periphery of the cylindrical lining and roof lining. 8 are generally vertical grooves or channels intersecting with generally horizontal grooves or channels 9 communicating with the manifold 7. 10 is a manifold in the outer lower portion of the cylindrical lining and the bottom lining communicating with the vertical grooves or channels 8. 11 and 12 are radial channels communicating respectively with the manifolds 7 and 10 associated with top and bottom lining. The radial channels 11 and 12 may be joined by generally tangential channels 13, if desired.

This arrangement of channels provides a hydraulic network about the outer periphery of the entire insulating lining. As shown the channels are open to and bounded on one side by the steel wall though if buried in the insulation close to the steel wall the result would be the same because of the porosity of the lining.

14 is a tank for the hydraulic fluid adapted to be heated, if desired, by a burner 15. The pump 16 draws liquid from the tank 14 through the piping 17 and discharges it under pressure into the manifold 7. The hydraulic fluid forced into the hydraulic network will to some extent penetrate the porous lining but will to a much greater extent penetrate the clearance space between the continuous steel tank wall and the porous lining and as pressure builds up will compress the porous lining to a point such that when the lining is chilled by the cold liquid, the shrinkage resulting from chilling will not be sufficient to relieve the pressure causing the initial shrinkage and as a result the cooling of the lining will not bring about any rupture of the lining.

The hydraulic fluid, whatever it may be, will of course tend to solidify as it warms or cools, as the case may be and it is only necessary to select depending on size and working temperatures the proper combination of paraffin or other materials which will result in a fluid that stays liquid long enough to build up the desired compressive pressure and then solidifies to remain in place, maintaining a constant pressure on the insulation, such pressure, of course, being below the point at which a permanent set of the insulation material may occur.

The hydraulic network insures generally uniform pressure throughout the entire area adjacent the contacting surfaces of steel wall and insulation and insures that the increase in pressure and resultant shrinkage will be generally uniform throughout the entire outer periphery of the lining.

In order to support the pressure applied to the top and bottom walls, they may be respectively concave with respect to the interior of the tank, though if flat, pressure resisting struts might be used.

I have not illustrated the method of assembling and installing of the lining up to the time when it is compressed. Any suitable means may well be used such as are well known in the art. My invention is directed to the means for and method of compressing the lining.

The lining itself, porous as it is, will limit the penetration of the hydraulic fluid no matter what the pressure because the porosity of the lining causes the liquid to penetrate in capillary filaments which are small enough to resist substantial penetration until the liquid has built up enough pressure to pre-compress the lining and has taken a permanent set to maintain such pressure.

Because any type of insulation even though self-supporting may develop slight differences in structural strength in various parts, I propose in order to insure that the lining be compressed or prestressed uniformly throughout without substantial distortion, that under some circumstances there will be placed inside the tank an anvil or limit mechanism which might take the form of a continuous removable inner lining for the tank although preferably a plurality of cylindrical rings will be sufficient. I propose, therefore, to place inside the tank two or more cylindrical liner or anvil members 20 and at each end of the tank convex end anvil members 21. Struts 22 and 23 join and support these four anvil members and may be collapsed, the struts being bolted together as indicated at 24 for removal after the pressure of the hydraulic fluid has done its work and compressed or prestressed the lining. Of course, after the hydraulic fluid has taken its permanent set and the lining has been compressed throughout, the necessity for these anvils or abutments will no longer exist and they will be removed before the tank is put into operation. Preferably, these abutments or anvils and their supporting structure will form a framework about which the lining will be erected, clearance being left between the abutting members and the lining to permit of the compression of the lining. The abutting members insure that compression will be substantially uniform. After the hydraulic fluid is set, then the abutments will be removed through a manhole which will at that time preferably be cut through the steel shell and the lining though, of course, the manhole might be provided in advance and plugged. I have not illustrated the manhole because it will normally not be put in place until after the precompressing action is complete.

I have indicated that the hydraulic fluid is inserted at the bottom of the tank. The hydraulic fluid will rise through the clearance and the lining and the steel shell of the tank and through the channels between the lining and the tank of those channels are present and will displace air to some extent at least through the porous lining. A plurality of pet cocks 25 are placed at the top of the tank so that air may have a free exit as it is displaced by the hydraulic fluid. As soon as the fluid begins to shut the pet cocks they will be closed and the pressure allowed to build up.

If desired, the steel tank may after assembly with the lining and before the hydraulic fluid is pumped in, be heated to a point which will maintain the hydraulic fluid in liquid condition. For example, if the hydraulic fluid remains a liquid at 115°, the steel wall of the tank will be heated to a little above 115° so that the hydraulic fluid will not prematurely take a permanent set. Once the pressure has been applied, it will be maintained as the tank shell cools until ambient temperatures are reached at which the hydraulic fluid takes its permanent set. Thereafter the pressure will no longer be applied and the tank will be closed so far as the hydraulic fluid entrance is concerned by screwing a plug into the hole through which the fluid entered the tank and the manhole for removal of the scaffold or abutments will then be made and the abutments will then be removed.

It will be understood that while under some circumstances the inter-communicating channels which freely conduct the hydraulic fluid to all parts of the outer periphery of the lining will be used. Under other circumstances, however, the lining may be erected with a sufficient clearance between it and the steel wall so that the resistance to flow of the hydraulic fluid will not cause any difficulty. Or under other circumstances the lining may be erected and the steel shell may then be heated to expand it enough and the amount will be very small, to provide a temporary clearance to permit entrance of the hydraulic fluid to all the surfaces of the lining. As the steel shell cools and contracts, it would not dangerously increase the pressure on the lining because the amount of expansion necessary to provide clearance would be very small.

I claim:

1. A tank for the storage of a cold boiling liquid comprising an impervious, rigid outer shell, a compressible, thick inner lining of a non-metallic, porous, heat insulating material, a network of interconnected channels about the outer face of the inner lining, an inlet through said shell in direct communication with said network of channels, and a material, liquid at a temperature above ambient temperature, filling such channels under pressure and compressing the said lining from the outer face inwardly and solidified in situ to maintain the lining in a compressed state whereby, when the cold is introduced into the tank, the shrinkage of the lining inwardly is at least in part neutralized by said compressed state of the lining thereby to eliminate destructive stresses in the lining.

2. A tank as claimed in claim 1 in which the impervious outer shell comprises a shell formed of a structurally strong metallic material.

3. A tank as claimed in claim 1 in which the inner lining comprises balsa wood.

4. A tank as claimed in claim 1 in which the material filling the channels and compressing the lining comprises a paraffin base substance.

References Cited in the file of this patent

UNITED STATES PATENTS

| | | |
|---|---|---|
| 135,232 | Manning | Jan. 28, 1873 |
| 1,159,865 | Pier | Nov. 9, 1915 |
| 1,883,662 | Fisher | Oct. 18, 1932 |
| 2,047,403 | Shepherd | Jan. 14, 1936 |
| 2,105,939 | Cook | Jan. 18, 1938 |
| 2,174,425 | Schlumbohm | Sept. 26, 1939 |
| 2,551,160 | Rehrig et al. | May 1, 1951 |
| 2,538,059 | Strunk | Jan. 16, 1952 |

FOREIGN PATENTS

| | | |
|---|---|---|
| 490,558 | Germany | Jan. 30, 1930 |